United States Patent
Joseph et al.

(10) Patent No.: US 7,821,921 B2
(45) Date of Patent: Oct. 26, 2010

(54) RELIABLE AND RESILIENT END-TO-END CONNECTIVITY FOR HETEROGENEOUS NETWORKS

(75) Inventors: Dinakaran Joseph, Apex, NC (US); Jon K. Franks, Apex, NC (US); Christopher N. Freeman, Cary, NC (US); Sivaram Gottimukkala, Morrisville, NC (US); Jason P. Hawrysz, Durham, NC (US); Lap T Huynh, Cary, NC (US); Barry Mosakowski, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 11/738,499

(22) Filed: Apr. 22, 2007

(65) Prior Publication Data

US 2008/0259790 A1    Oct. 23, 2008

(51) Int. Cl.
*H04J 1/16* (2006.01)
*G06F 11/00* (2006.01)
*G06F 15/173* (2006.01)

(52) U.S. Cl. .................. 370/218; 370/242; 714/2; 709/226; 709/239

(58) Field of Classification Search ......... 370/216–218, 370/221, 242, 401, 466; 714/100, 1, 2; 709/223, 709/224

See application file for complete search history.

(56) References Cited

U.S. PATENT DOCUMENTS

| | | | |
|---|---|---|---|
| 5,557,748 A | 9/1996 | Norris | |
| 6,430,595 B1 * | 8/2002 | Ferguson et al. | 709/200 |
| 6,532,241 B1 * | 3/2003 | Ferguson et al. | 370/469 |
| 6,961,762 B1 | 11/2005 | Yeap et al. | |
| 7,093,010 B2 * | 8/2006 | Ostrup et al. | 709/223 |
| 2002/0103909 A1 * | 8/2002 | Devine et al. | 709/227 |
| 2003/0225876 A1 * | 12/2003 | Oliver et al. | 709/224 |
| 2004/0205219 A1 | 10/2004 | Li et al. | |
| 2005/0259572 A1 * | 11/2005 | Esfahany et al. | 370/217 |

FOREIGN PATENT DOCUMENTS

WO        03024007        9/2002

* cited by examiner

*Primary Examiner*—Nittaya Juntima
(74) *Attorney, Agent, or Firm*—Joseph E. Bracken, Esq.; Steven M. Greenberg, esq.; Carey Rodriguez Greenberg & Paul LLP

(57) ABSTRACT

Embodiments of the present invention address deficiencies of the art in respect to connectivity management in a heterogeneous network and provide a method, system and computer program product for resilient and reliable end-to-end connectivity in a heterogeneous network. In one embodiment of the invention, a method for resilient and reliable end-to-end connectivity in a heterogeneous network environment can be provided. The method can include creating an instance of an abstracted network resource model (NRM) for a heterogeneous network environment of different network resource nodes. The method further can include binding an application endpoint in the instance of the abstracted NRM with a connectivity endpoint for a first of the different network resource nodes. The method yet further can include detecting an outage in the first of the different network resource nodes. Finally, the method can include re-binding the application endpoint to a second of the different network resource nodes in response to detecting the outage.

6 Claims, 3 Drawing Sheets

RELIABLE AND RESILIENT END-TO-END CONNECTIVITY FOR HETEROGENEOUS NETWORKS

BACKGROUND OF THE INVENTION

1. Field of the Invention

The present invention relates to the field of network connectivity and more particularly to end-to-end connectivity for heterogeneous networks.

2. Description of the Related Art

The rapid growth of the Internet and the World Wide Web has driven most information technologists to add support for networking infrastructure and applications based upon the Transport Control Protocol/Internet Protocol (TCP/IP). Nonetheless, many continue to utilize applications, devices, and networking infrastructure based upon the well established Systems Network Architecture (SNA) or its follow-on, Advanced Peer-to-Peer Networking (APPN). In the latter circumstance, SNA has formed the basis of mission-critical systems and applications that have been developed, enhanced, and tested over a period of decades.

SNA is often the underlying architecture of the applications that are at the very heart of the information technology infrastructure. Organizations managing both SNA and Internet protocol (IP) applications and infrastructure have had two basic choices: maintain two separate networks, or migrate to a common IP backbone and integrate both environments. Although expensive to maintain two different networks, some organizations accept the cost in order to minimize the disruption to the mission-critical SNA applications. Other, more ambitious organizations choose to integrate.

Recent technologies permit organizations to straddle the fence between integration and maintaining two separate networks. Utilizing data link switching (DLSw), enterprises have been able to transport SNA data over IP networks. While DLSw is a well-established technology, Enterprise Extender (EE) technology represents a superior approach to SNA/IP integration. EE technology offers organizations the ability to keep existing SNA devices and applications, but support pure IP from end to end with no loss of availability or reliability. In this regard, EE facilitates the creation of a totally IP-based network, from host to host.

Notably, until recently applications were mostly deployed in a homogeneous, secure and predictable environment which was centrally managed, EE enables a distributed, heterogeneous environment. The concurrent rise in popularity of new application technologies like Voice over IP (VoIP), video communications and distributed storage, however, has placed unforeseen stress on the newly integrated heterogeneous networks in that the real-time nature of these technologies require the heterogeneous network to be much more dynamic and resilient. The dynamic nature of the heterogeneous network also has added the requirement for applications to be much more aware of the network and the need to merge the application intelligence with the network and vice-versa.

The requirements, however, counter the ability to leverage both the SNA and TCP/IP network architectures to transport data end-to-end independent of network protocol. This is so because an application using SNA does not realize there is a path to the endpoint using the TCP/IP infrastructure unless the EE has been manually configured in both the Virtual Telecommunications Access Method (VTAM) and IP configuration definitions. Currently, EE allows the manual configuration of an APPN network using the UDP/IP architecture. However, these definitions are known to be prone to configuration errors. Yet, there is no mechanism to dynamically configure this APPN EE link based on the network overlay. Thus, despite the flexibility afforded by EE, at present, there is not a mechanism to dynamically build a network overlay to determine IP and SNA connectivity and subsequently, to use the information to determine data routing for an application independent of the network architecture.

BRIEF SUMMARY OF THE INVENTION

Embodiments of the present invention address deficiencies of the art in respect to connectivity management in a heterogeneous network and provide a novel and non-obvious method, system and computer program product for resilient and reliable end-to-end connectivity in a heterogeneous network. In one embodiment of the invention, a method for resilient and reliable end-to-end connectivity in a heterogeneous network environment can be provided. The method can include creating an instance of an abstracted network resource model (NRM) for a heterogeneous network environment of different network resource nodes. The method further can include binding an application endpoint in the instance of the abstracted NRM with a connectivity endpoint for a first of the different network resource nodes. The method yet further can include detecting an outage in the first of the different network resource nodes. Finally, the method can include re-binding the application endpoint to a second of the different network resource nodes in response to detecting the outage.

In another embodiment of the invention, a heterogeneous network data processing system can be configured for resilient and reliable end-to-end connectivity. The system can include first and second different communications networks of differing network types, a network resource manager abstracting the communications networks as manageable resources, and end-to-end communications monitoring and remediation logic. The logic can include program code enabled to bind an application endpoint with a connectivity endpoint for the first communications network, to detect an outage in the first communications network, and to re-bind the application endpoint to the second communications network in response to detecting the outage. In this regard, the manageable resources can be arranged in an NRM managed by the network resource manager. Moreover, the network type for the first communications network can include an SNA type network and the network type for the second communications network can include an IP type network.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for resilient and reliable end-to-end connectivity in the heterogeneous network. In accordance with an embodiment of the present invention, resource connectivity for different network types can be abstracted as managed nodes in an instance of a resource abstraction model of a heterogeneous network. Thereafter, the state of application connectivity with a coupled one of the managed nodes can be monitored. Responsive to detecting a connectivity failure in the coupled one of the nodes, a new one of the managed nodes can be recommended in the instance of the resource abstraction model and connectivity can fail over to the new one of the managed nodes for the application.

Figure 1:
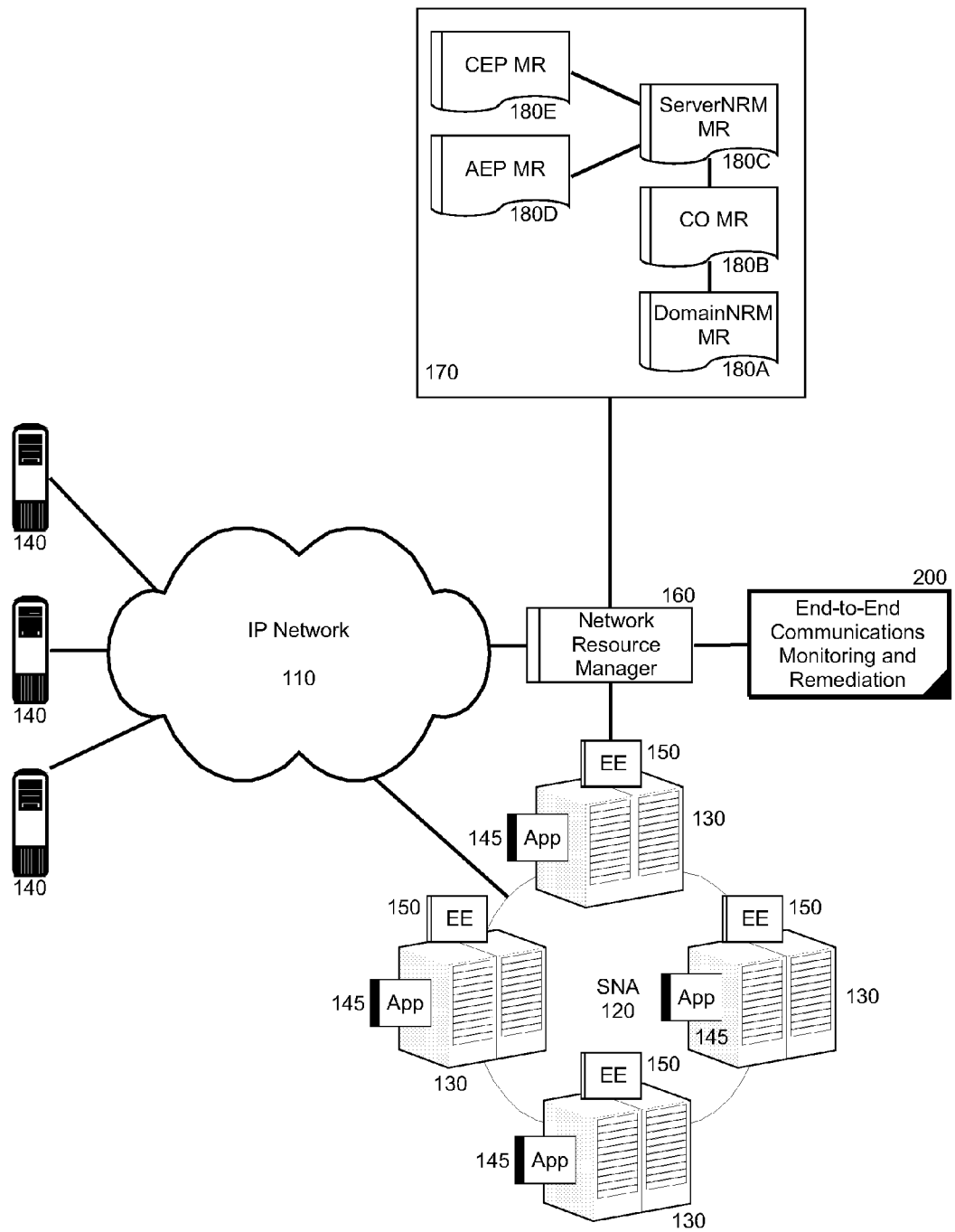
FIG. 1 is a schematic illustration of a heterogeneous network configured for resilient and reliable end-to-end connectivity.

In further illustration, FIG. 1 is a schematic illustration of a heterogeneous network configured for resilient and reliable end-to-end connectivity. As shown in FIG. 1, the heterogeneous network can be an integrated IP/SNA network. The integrated IP/SNA network can include an IP network 110 including one or more server computing devices 140 configured to interoperate according to TCP/IP. The integrated IP/SNA network further can include an SNA network 120 including one or more SNA type computing devices 130, such as mainframe or midrange computers configured to interoperate according to SNA.

The IP network 110 can be coupled to the SNA network 120 through an EE 150 disposed in each of the SNA type computing devices 130. The EE 150 can provide an integration bridge between the SNA network 120 and the IP network 110 so as to allow interoperability for the SNA type devices 130 with the server computing devices 140 in the IP network. In particular, applications 145 disposed in the SNA type computing devices 130 can be SNA type applications or IP type applications accessing either the IP network 110 through the EE 150, or the SNA network 120 directly. A network resource manager 160 can be coupled to each EE 150 and can be configured to manage an instance of an abstracted NRM 170 for the heterogeneous network of FIG. 1. The NRM 160 can define a set of networking services based on web services, and a resource abstraction model that defines network resources at an aggregate level. The objective is to provide a simplified view and the management of network connectivity that satisfies service level objectives in QoS, Security, and Intrusion Defense (IDS).

The abstracted NRM 170 can include a domain NRM managed resource 180A coupled to a connectivity overlay managed resource 180B further coupled to a server NRM managed resource 180C. The server NRM managed resource 180C yet further can be coupled to a connectivity endpoint managed resource 180E and an application endpoint managed resource 180D. An instance of the domain NRM managed resource 180A can include a domain level service configured to manage the networking infrastructure for a specified domain. In particular, the instance of the domain NRM managed resource 180A can be configured to provision an instance of the connectivity overlay managed resource 180B. Each instance of the connectivity overlay managed resource 180C can include a representation of an end-to-end network overlay providing application connectivity into the network. Each instance of the connectivity overlay managed resource 180C further can include a specification for network attributes, including quality of service (QoS), intrusion detection and secure communications consistent with the service level objectives of the client application.

Each instance of the server NRM managed resource 180C can include a node service configured to discover, provision and monitor both instances of the application endpoint managed resource 180D and the connectivity endpoint managed resource 180E. Application endpoint managed resource 180D instances, in turn, can represent respective applications bound to corresponding instances of the connectivity endpoint managed resource 180E. Finally, each instance of the connectivity endpoint can represent network connectivity to a specific network. In this way, the connectivity for an instance of an application endpoint managed resource 180D virtually bound through an instance of the server NRM managed resource can vary from one instance of a connectivity endpoint managed resource 180E to another.

Notably, end-to-end communications monitoring and remediation logic 200 can be coupled to the network resource manager 160. The end-to-end communications monitoring and remediation logic 200 can include program code enabled to monitor the health of an instance of a connectivity endpoint managed resource 180E for an instance of an application endpoint managed resource 180D. The program code can be further enabled, upon detecting a failure in connectivity for the instance of the connectivity endpoint managed resource 180E, to identify an alternative, available instance of the connectivity endpoint managed resource 180E for the instance of the application endpoint managed resource 180D. Finally, the program code can be yet further enabled to associate the alternative, available instance of the connectivity endpoint managed resource 180E with the instance of the application endpoint managed resource 180D.

Figure 2:
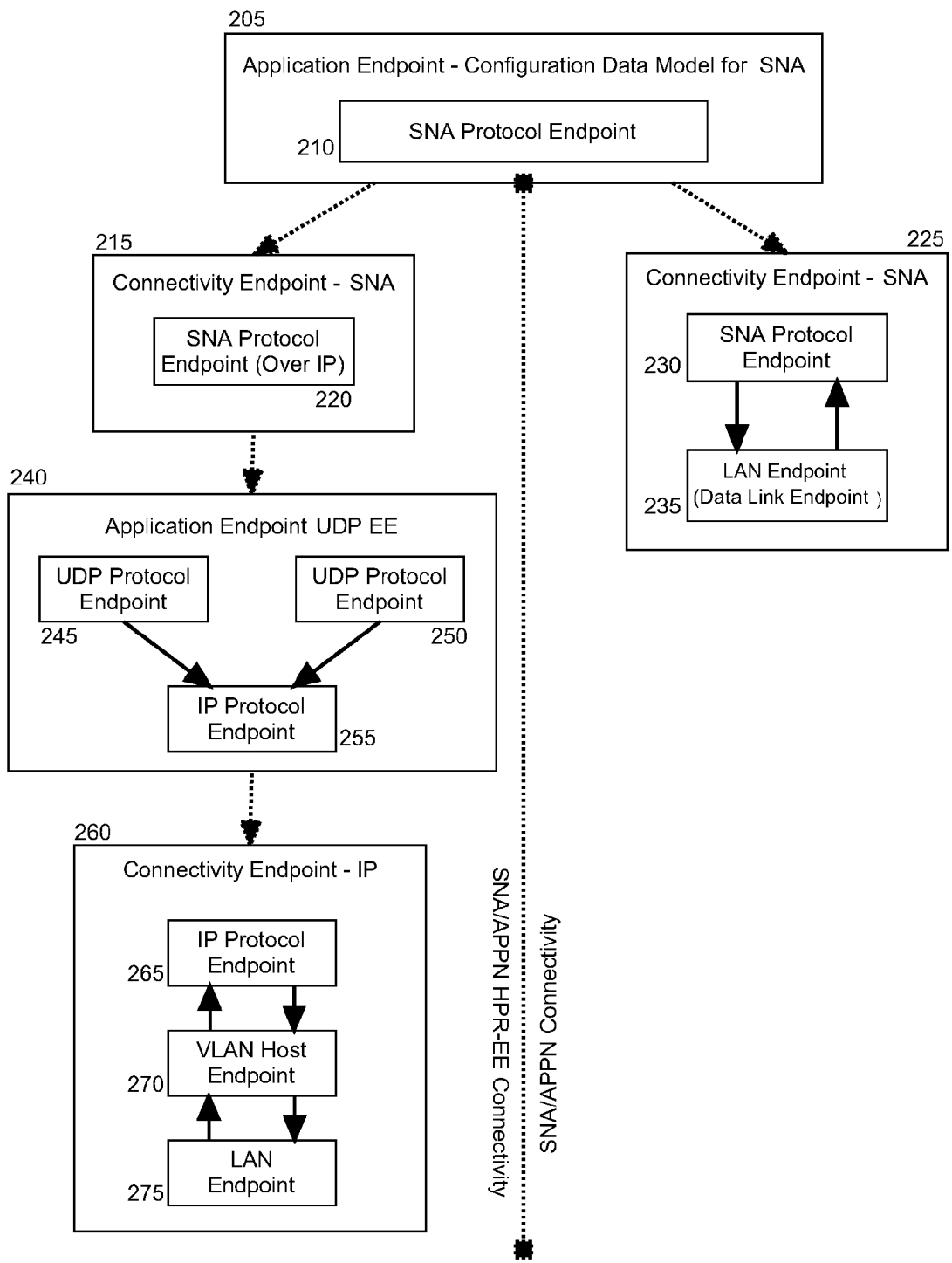
FIG. 2 is a block diagram illustrating a heterogeneous network architecture configured for resilient and reliable end-to-end connectivity; and, FIG. 3 is an event diagram illustrating a process for resilient and reliable end-to-end connectivity in the heterogeneous network of FIG. 1.

In yet further illustration, FIG. 2 is a block diagram illustrating a heterogeneous network architecture configured for resilient and reliable end-to-end connectivity. Specifically, the architecture shown in FIG. 2 illustrates an instance of an abstracted network resource model of a heterogeneous network including an SNA network and a TCP/IP network. As illustrated, an application endpoint 205 can be associated with an SNA protocol endpoint 210. The association can be virtual in nature and can vary from a connectivity endpoint 225 for physical SNA/APPN connectivity, to a connectivity endpoint 215 for physical HPR-EE connectivity.

The connectivity endpoint 215 can be configured with an SNA protocol endpoint over IP 220, whereas the connectivity endpoint 225 can be configured with an SNA protocol endpoint 230 coupled to a data link endpoint 235. The SNA protocol endpoint over IP 220 further can be coupled to an EE for UDP/240 IP including UDP protocol endpoints 245, 250 and an IP protocol endpoint 255. The IP protocol endpoint 255, in turn, can be coupled to connectivity endpoint for IP 260, including an IP protocol endpoint 265 coupled to a virtual local area network (VLAN) host endpoint 270 coupled to a LAN endpoint 275. In this way, connectivity can be established for the application endpoint 205 through either of the connectivity endpoints 215 in order to maintain continuity of connectivity for the application endpoint 205.

Figure 3:
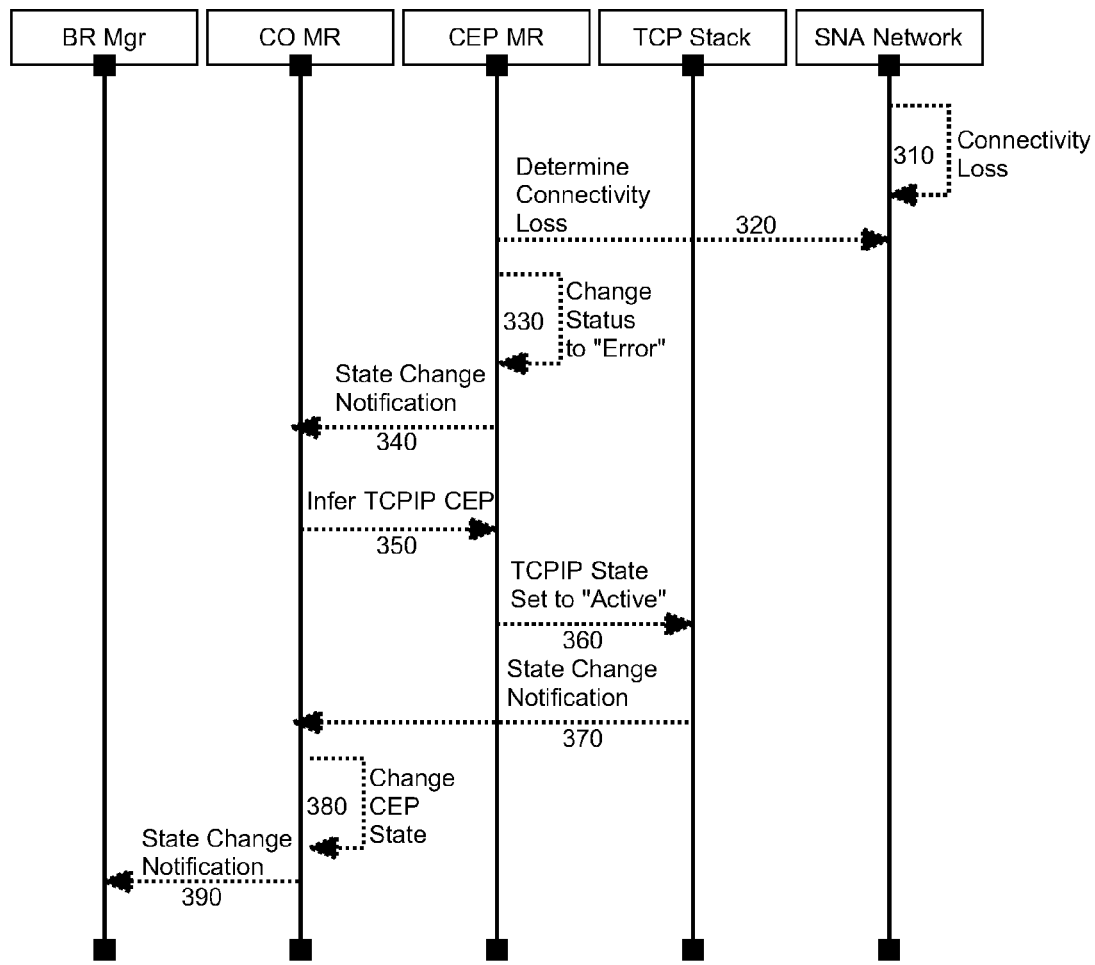

In even yet further illustration, FIG. 3 is an event diagram illustrating a process for resilient and reliable end-to-end connectivity in the heterogeneous network of FIG. 1. The heterogeneous network of FIG. 3 can include two different network nodes, separately bindable to an application endpoint via a connectivity endpoint managed resource. Beginning in path 310, connectivity loss can be determined in a bound network node and in path 320, the connectivity endpoint managed resource binding the application endpoint to the network node can detect the connectivity loss. Thereafter, in path 330 the connectivity endpoint managed resource can change its status to an error condition and in path 340 can notify a coupled connectivity overlay managed resource of the state change.

In path 350, the connectivity overlay managed resource can suggest to the connectivity endpoint managed resource a different network node for connectivity and in path 360, the connectivity endpoint managed resource can re-bind the application endpoint to the different network node suggested by the connectivity overlay managed resource. The different network node, in turn, can notify the connectivity overlay managed resource of the state change in path 370 and, in response, the connectivity overlay managed resource can changed the connectivity endpoint state in path 380 accordingly. Finally, in path 390 the connectivity overlay managed resource can notify a business continuity manager of the change in state.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain or store the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for resilient and reliable end-to-end connectivity in a heterogeneous network environment, the method comprising:

creating in a network resource manager executing in memory by a processor of a computing device, an instance of an abstracted network resource model (NRM) for a heterogeneous network environment of different network resource nodes;

binding an application endpoint in the instance of the abstracted NRM with a connectivity endpoint for a first of the different network resource nodes;

detecting an outage in the first of the different network resource nodes; and, re-binding the application endpoint to a second of the different network resource nodes in response to detecting the outage, wherein creating an instance of an abstracted NRM for a heterogeneous network environment of different network resource nodes, comprises:

instantiating a connectivity overlay managed resource for end-to-end connectivity for an application;

configuring the instance of the connectivity overlay managed resource with application attributes consistent with performance and security requirements for the application; and, provisioning multiple different instances of a connectivity endpoint managed resource and associating each of the instances of the connectivity endpoint managed resource with a corresponding one of the multiple different network endpoints, each of the network endpoints being bindable to an instance of an application endpoint for the application.

2. The method of claim 1, wherein creating an instance of an abstracted NRM for a heterogeneous network environment of different network resource nodes further, comprises:

provisioning an instance of a connectivity endpoint managed resource for a systems network architecture (SNA) network, and an instance of a connectivity endpoint managed resource for an Internet protocol (IP) network; and associating the instance of the connectivity endpoint managed resource for the SNA network with an SNA network endpoint, and the instance of the connectivity endpoint managed resource for the IP network with an IP network endpoint, each of the network endpoints being bindable to an instance of an application endpoint for the application.

3. A heterogeneous network data processing system configured for resilient and reliable end-to-end connectivity, the system comprising:

first and second different communications networks of differing network types, wherein the network type for the first communications network comprises of a systems network architecture (SNA) network and wherein the network type for the second communications network comprises an Internet protocol (IP) network;

a network resource manager abstracting the communications networks as manageable resources by instantiating a connectivity overlay managed resource for end-to-end connectivity for an application, configuring the instance of the connectivity overlay managed resource with application attributes consistent with performance and security requirements for the application, and provisioning multiple different instances of a connectivity endpoint managed resource and associating each of the instances of the connectivity endpoint managed resource with a corresponding one of the multiple different network endpoints, each of the network endpoints being bindable to an instance of an application endpoint for the application; and, end-to-end communications monitoring and remediation logic comprising program code enabled to bind an application endpoint with a connectivity endpoint for the first communications network, to detect an outage in the first communications network, and to re-bind the application endpoint to the second communications network in response to detecting the outage.

4. The system of claim 3, wherein the manageable resources are arranged in a network resource model (NRM) managed by the network resource manager.

5. A computer program product comprising a non-transitory computer usable medium embodying computer usable program code for resilient and reliable end-to-end connectivity in a heterogeneous network environment, the computer program product comprising:

computer usable program code for creating an instance of an abstracted network resource model (NRM) for a heterogeneous network environment of different network resource nodes;

computer usable program code for binding an application endpoint in the instance of the abstracted NRM with a connectivity endpoint for a first of the different network resource nodes;

computer usable program code for detecting an outage in the first of the different network resource nodes; and, computer usable program code for re-binding the application endpoint to a second of the different network resource nodes in response to detecting the outage, wherein the computer usable program code for creating an instance of an abstracted NRM for a heterogeneous network environment of different network resource nodes, comprises:

computer usable program code for instantiating a connectivity overlay managed resource for end-to-end connectivity for an application;

computer usable program code for configuring the instance of the connectivity overlay managed resource with application attributes consistent with performance and security requirements for the application; and, computer usable program code for provisioning multiple different instances of a connectivity endpoint managed resource and associating each of the instances of the connectivity endpoint managed resource with a corresponding one of the multiple different network endpoints, each of the network endpoints being bindable to an instance of an application endpoint for the application.

6. The computer program product of claim 5, wherein the computer usable program code for creating an instance of an abstracted NRM for a heterogeneous network environment of different network resource nodes further, comprises:

computer usable program code for provisioning an instance of a connectivity endpoint managed resource for a systems network architecture (SNA) network, and an instance of a connectivity endpoint managed resource for an Internet protocol (IP) network; and associating the instance of the connectivity endpoint managed resource for the SNA network with an SNA network endpoint, and the instance of the connectivity endpoint managed resource for the IP network with an IP network endpoint, each of the network endpoints being bindable to an instance of an application endpoint for the application.

* * * * *